US011667080B2

(12) United States Patent
Indyk et al.

(10) Patent No.: US 11,667,080 B2
(45) Date of Patent: Jun. 6, 2023

(54) SYSTEM FOR OBTAINING A PHOTOPOLYMERIZED PREPOLYMER

(71) Applicant: Mighty Buildings, Inc., San Francisco, CA (US)

(72) Inventors: Denis Indyk, Tomsk (RU); Alexander Trushin, Tomsk (RU); Anna Trushina, Tomsk (RU); Aleksei Dubov, Moscow (RU); Dmitry Starodubtsev, Tomsk (RU); Slava Solonitsyn, Singapore (SG)

(73) Assignee: Mighty Buildings, Inc., San Francisco, CA (US)

( * ) Notice: Subject to any disclaimer, the term of this patent is extended or adjusted under 35 U.S.C. 154(b) by 1036 days.

(21) Appl. No.: 16/397,655

(22) Filed: Apr. 29, 2019

(65) Prior Publication Data
US 2020/0338828 A1 Oct. 29, 2020

(51) Int. Cl.
*B29C 64/321* (2017.01)
*C08F 2/48* (2006.01)
(Continued)

(52) U.S. Cl.
CPC .......... *B29C 64/321* (2017.08); *B29C 64/135* (2017.08); *B29C 64/264* (2017.08);
(Continued)

(58) Field of Classification Search
None
See application file for complete search history.

(56) References Cited

U.S. PATENT DOCUMENTS

| 4,150,169 A | 4/1979 | Bagtley et al. |
| 4,544,626 A | 10/1985 | Sullivan |

(Continued)

OTHER PUBLICATIONS

"Prepolymer" (Wikipedia) Dec. 21, 2016 (Dec. 21, 2016) retrieved from <https://en.wikipedia.org/w/index.php?title=Prepolymer&oldid=755943875> entirety of document.
International Search Report in International Application No. PCT/US2020/030553, dated Aug. 4, 2020.

*Primary Examiner* — Timothy Kennedy
*Assistant Examiner* — Olukorede Esan
(74) *Attorney, Agent, or Firm* — Cognition IP, P.C.; Edward Steakley; Justin White

(57) ABSTRACT

A system for obtaining a photopolymerized prepolymer for use as a component of a material suitable for manufacturing buildings or building components by 3D printing processes. The system contains a flexible closed loop conveyor stretched between a precursor loading station and a prepolymerization material receiver from which the product is unloaded to a construction 3D printing machine. The conveyor carries a plurality of flexible trays capable of looping around the pulleys of the closed loop conveyor. The trays are shallow troughs that have open tops and carry dosed portions of the precursor, which is photopolymerized on its way from the loading station to the unloading station by sequentially passing under light sources of two photopolymerization stations. When the trays pass through the unloading position, they are turned upside-down and allow the precured material to fall into a receiver.

20 Claims, 2 Drawing Sheets

(51) Int. Cl.
*C08F 20/18* (2006.01)
*B29C 64/135* (2017.01)
*B29C 64/264* (2017.01)
*B29C 64/314* (2017.01)
*B29C 64/357* (2017.01)
*B65G 15/40* (2006.01)
*B29C 64/393* (2017.01)
*B33Y 40/10* (2020.01)
*B65G 17/12* (2006.01)
*B33Y 70/00* (2020.01)
*B33Y 10/00* (2015.01)
*B33Y 50/02* (2015.01)

(52) U.S. Cl.
CPC .......... *B29C 64/314* (2017.08); *B29C 64/357* (2017.08); *B29C 64/393* (2017.08); *B33Y 40/10* (2020.01); *B65G 15/40* (2013.01); *B65G 17/12* (2013.01); *C08F 2/48* (2013.01); *C08F 20/18* (2013.01); *B33Y 10/00* (2014.12); *B33Y 50/02* (2014.12); *B33Y 70/00* (2014.12); *B65G 2207/46* (2013.01)

(56) References Cited

U.S. PATENT DOCUMENTS

| | | | |
|---|---|---|---|
| 6,051,179 A * | 4/2000 | Hagenau | B33Y 50/02 264/401 |
| 6,720,393 B1 * | 4/2004 | George | C08F 10/00 422/138 |
| 6,927,018 B2 | 8/2005 | Burtgess | |
| 9,394,441 B2 | 7/2016 | Xu et al. | |
| 2004/0121114 A1 * | 6/2004 | Piana | D06M 11/70 427/372.2 |
| 2012/0211155 A1 * | 8/2012 | Wehning | A61C 13/0018 156/380.9 |
| 2014/0296414 A1 * | 10/2014 | Hattori | B29B 7/90 524/495 |
| 2016/0214327 A1 * | 7/2016 | Uckelmann | B29C 64/236 |
| 2016/0361704 A1 | 12/2016 | Won et al. | |
| 2017/0120332 A1 * | 5/2017 | DeMuth | B33Y 70/00 |
| 2018/0281236 A1 | 10/2018 | Elgar et al. | |
| 2020/0262146 A1 * | 8/2020 | Barnes | B29C 64/314 |

* cited by examiner

SYSTEM FOR OBTAINING A PHOTOPOLYMERIZED PREPOLYMER

FIELD OF THE INVENTION

The present invention relates to a system for obtaining a photopolymerized prepolymer, more specifically, to the aforementioned system for obtaining a photopolymerized prepolymer suitable for use as a component of a construction material. In particular, the invention is intended for preparation of a photopolymerized prepolymer for use as a component of a material used in the, manufacture of buildings or building components such as walls, floors, ceilings, exterior and interior cladding, furniture etc., or features such as outdoor and indoor features etc. by 3D printing processes.

DESCRIPTION OF THE PRIOR ART

Over the past decade, three-dimensional printing (hereinafter-3D printing) has become, a big buzz term in the industry and starts penetrating even into such a field as the construction sector. With 3D printers now capable of printing building walls and processing cements, the technology could help reshape the traditional construction technique and products.

The history of 3D printing in construction is not yet rich. In 2004, a University of South Carolina made an attempt to produce a wall by 3D printing which was widely accepted as the technology's first entry into construction. In 2014, a full canal house built using 3D printing was completed in Amsterdam. In 2016, a 3D-printed mansion was completed in China. Also in 2016, the Dubai Future Foundation built its office via 3D printing which is considered as major milestone for the technology in the commercial construction sector. The fully functioning 2,700-square foot building was built by a large 3D printer that measured 120×40×20 feet. Construction took just 17 days.

The benefits of 3D printing in construction are the following: speed, waste reduction, design freedom, and reduced human errors. The challenges of 3D printing in construction are high cost, labor shortage, quality control, and a lack of appropriate regulations.

Nevertheless, the use of 3D printing in construction has already been mentioned in patent literature, including polymerization systems, which cure a starting polymerizable material by photopolymerization.

Thus, U.S. Pat. No. 9,394,441 issued on Jul. 19, 2015 to P. Xu, et al. discloses a build material for use in a three-dimensional printing system. The material consists of a curable oligomeric material, a reactive component, a non-reactive component comprising one or more urethane waxes, and at least one diluent. The reactive component of the material is at least one chemical moiety that is polymerizable with a chemical moiety contained in the oligomeric curable material and/or at least one diluent. The reactive component is present in the build material as crystalline regions.

Although U.S. Pat. No. 9,394,441 does not explicitly teach curing of the polymerizable material by photopolymerization, one can assume that such a curing method is provided. It is stated that in some embodiments, suitable photoinitiators comprise those operable for use with a HeCd laser radiation source, including acetophenones, conveniently 2,2-dialkoxybenzophenones and 1-hydroxyphenyl ketones, for example 1-hydroxycyclohexyl phenyl ketone or 2-hydroxyisopropyl phenyl ketone (=2-hydroxy-2,2-dimethylacetophenone).

Additionally, in some embodiments, suitable photoinitiators comprise those operable for use with an Ar laser radiation source including benzyl ketals, such as benzyl dimethyl ketal. In some embodiments, a photoinitiator comprises an α-hydroxyphenyl ketone, benzyl, dimethyl ketal or 2,4,6-trimethylbenzoyl diphenylphosphine oxide or a mixture thereof.

U.S. Pat. No. 6,927,018 issued on Aug. 9, 2005 to R. Burgess relates to three-dimensional printing using photo-activated building materials. The publication discloses a method, an article of manufacture, and a system for fabricating an article using photo-activatable building material. The method includes the steps of applying a layer of a photo-activatable building material to a preselected surface, scanning the layer using a plurality of light-emitting centers to photo-activate the layer of photo-activatable building material in accordance with a predetermined photoinitiation process to obtain polymerization of the building material, wherein scanning is accomplished at a predetermined distance using a predetermined light intensity, and repeating the steps of applying the layer, with each layer being applied to an immediately previous layer, and scanning the layer with the plurality of light-emitting centers to polymerize the building material until the article is fabricated. Photo-activatable building materials exemplified herein as materials suitable for the manufacture of building components in the proposed 3D printing method are the Shipley Microposit S1800 Series Photo Resists. The Shipley Microposit S1800 Series Photo Resists are optimized for G-line (0.436 microns) exposure, effective for broadband exposure, and have high-resolution process parameters. For example, Shipley Microposit S1813 has a 12.3 micrometer thickness, requires 150 mJ/cm$^2$ for polymerization ("printing"), and may be polymerized at the G-line (0.54 NA).

However, in spite of the ability of various organic polymers, a task of finding a prepolymerization system and an organic material suitable for the preparation of a prepolymer for use as a component of a material having characteristics optimal for use in 3D printing of construction components remains vital.

SUMMARY OF THE INVENTION

The present invention relates to a system and method for obtaining a photopolymerized prepolymer for use as a component of a material suitable for manufacturing buildings or building components such as walls, floors, exterior and interior cladding, furniture etc., or features such as indoor and indoor features, etc. by 3D printing processes.

The system contains a dosed loop conveyor in the form of a flexible belt stretched between a precursor loading station and a prepolymerization material receiver from which the product is unloaded to a construction 3D printing machine. The conveyor carries a plurality of flexible trays capable of looping around the pulleys of the closed loop conveyor. One of the pulleys is a driving pulley, which is equipped with a driving motor. The trays are shallow troughs that have open tops and carry dosed portions of the precursor, which is photopolymerized on its way from the loading station to the unloading station by sequentially passing under light sources of two photopolymerization stations.

In other words, the conveyor or a flexible belt has a loading position on the side of the untreated material (precursor) loading station and unloading position on the side opposite to the loading position, wherein, when the material-receiving trays pass through the unloading position, the material-receiving trays are turned upside-down, i.e. into positions in which the open tops of the trays face down.

Each station consists of a plurality of light-emitting devices (LEDs) operating on predetermined wavelength(s) and irradiating the material that fills the trays with a predetermined dosed amount of light energy to precure the material to a desired viscosity. The parameters of the process (viscosity, radiation dose, etc.) are automatically controlled by sensors via a central processing unit. Prior to unloading, an uncured liquid phase is separated from the prepolymer and is returned to the loading station for reuse.

DETAILED DESCRIPTION OF THE INVENTION

The present invention relates to a system for obtaining a photopolymerized prepolymer, more specifically, to the aforementioned system and method for obtaining a photopolymerized prepolymer suitable for use as a component of a construction material. In particular, the invention is intended for preparation of a photopolymerized prepolymer for use as a component of a material used in the manufacture of buildings or building components such as walls, floors, etc. by 3D printing processes.

Figure 1:
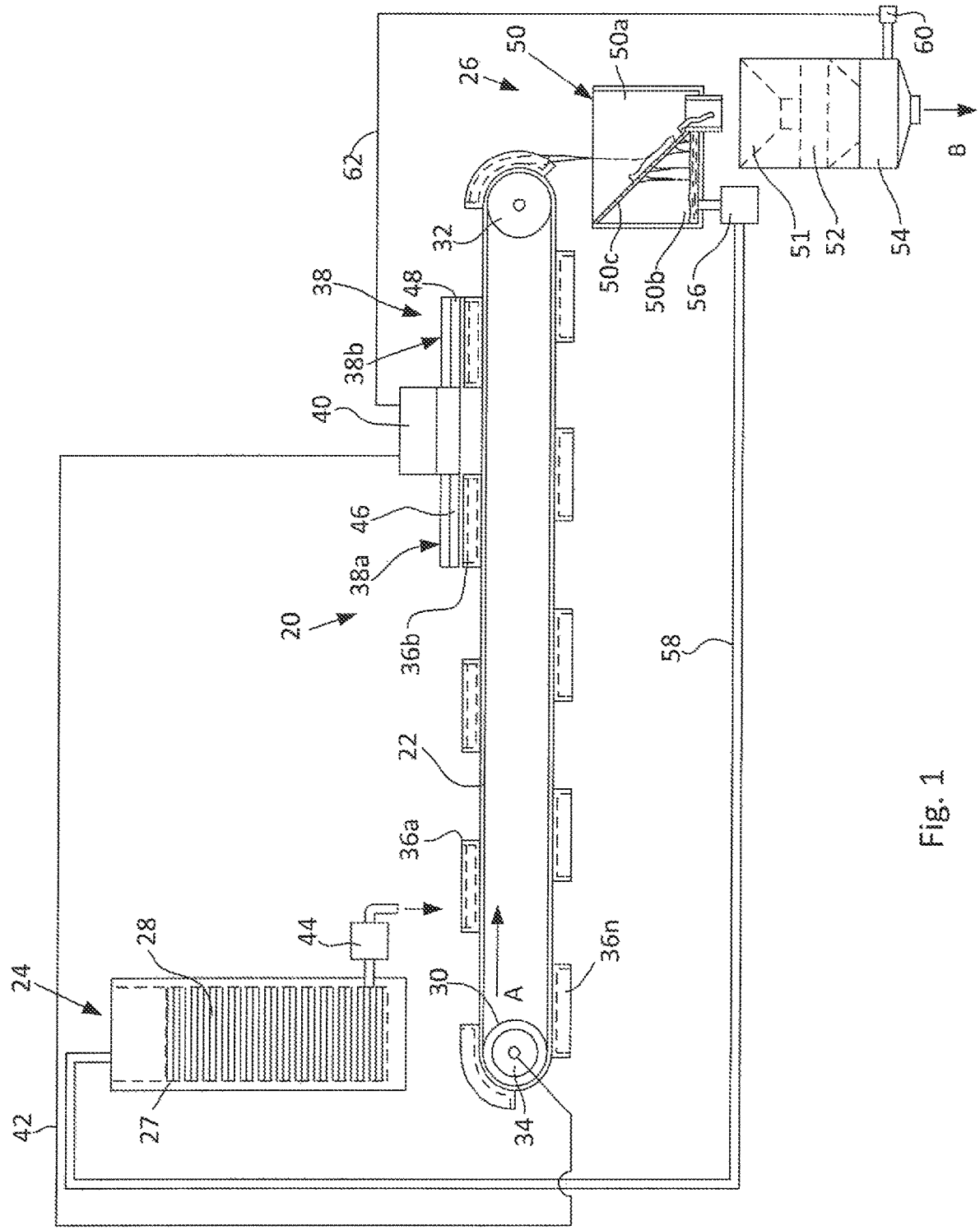
FIG. 1 is a schematic general view of the system of the invention for obtaining a photopolymerized prepolymer.

The system of the invention (hereinafter referred to merely as a "system") is shown in FIG. 1 in a schematic form and is designated by reference numeral 20. The system is intended for the preparation of a photopolymerized organic material for use in a mixture with other components in the manufacture of buildings or building parts by 3D printing. The system 20 is intended for providing a continuous and effective prepolymerization of photocurable photopolymerizable material by irradiating the prepolymerizable material under the effect of light emitted from light sources installed on the way of the photopolymerizable material, which is transported from a starting material loader to the prepolymerized material output station.

More specifically, as shown in FIG. 1, the system 20 contains a transporting unit in the form of a closed loop conveyor 22, e.g., a flexible belt that extends from a loading position, i.e., a prepolymerizable material input station 24, to an unloading position on the side opposite to the loading position, i.e., a prepolymerized material output station 26.

The input station is provided with a tank 27, which contains a starting photoprepolymerizable material 28 in a liquid state and a solid PEG 4000 powder suspended in the liquid media.

The closed loop conveyor 22, i.e., a flexible belt, is guided around pulleys 30 and 32, one of which, e.g., the pulley 30, is a driving pulley and another, i.e., the pulley 32, is a driven pulley. The pulley 30 is driven into rotation by a motor 34 via a driver (not shown). The upper run of the conveyor 22 moves in the direction of arrow A (FIG. 1).

Attached to the surface of the conveyor 22 is a plurality of prepolymerization trays (hereinafter referred to as "material-receiving trays") 36a, 36b, 36n (FIG. 1). The trays may be spaced from one another at a predetermined distance or may be connected to each other as links of a tractor tracks.

Figure 2:
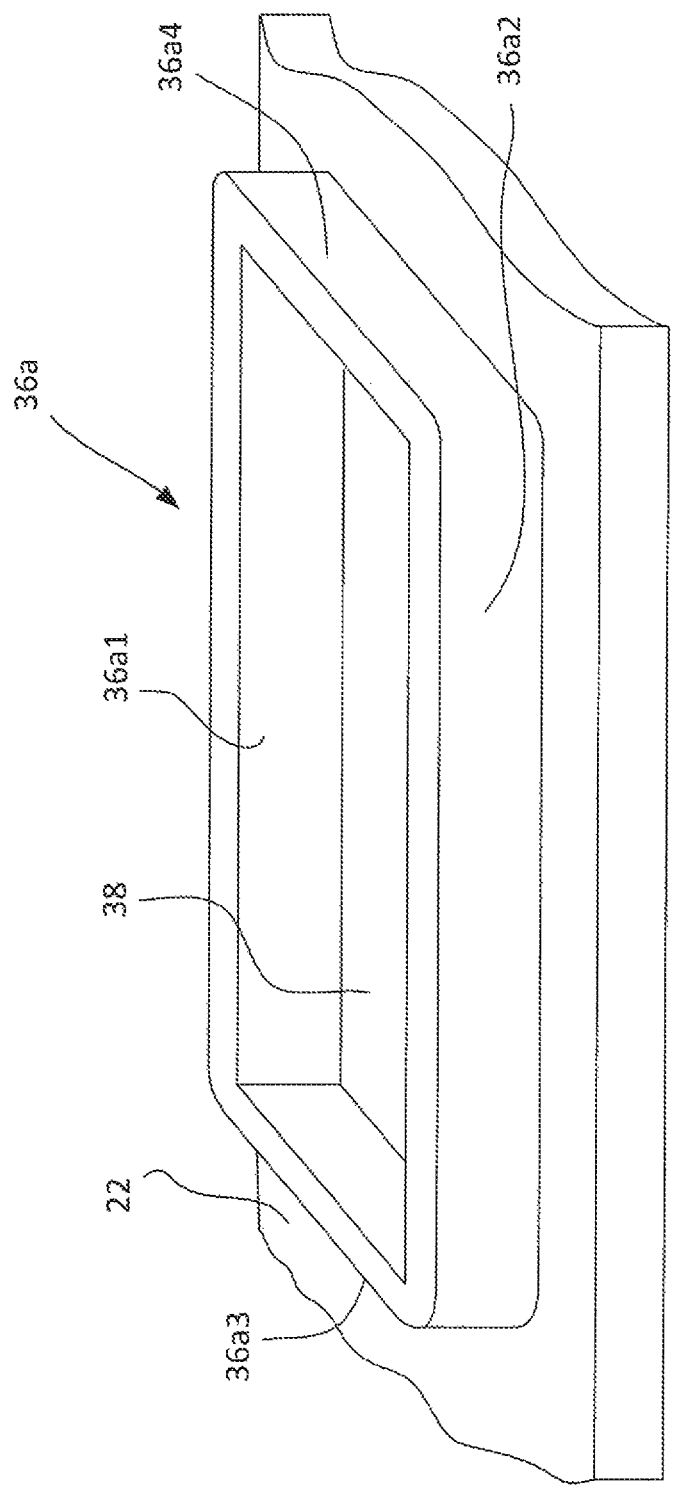
FIG. 2 is a three-dimensional view of a tray used in the system of FIG. 1.

As can be see from FIG. 2, which is a three-dimensional view of one of the material-receiving trays, e.g., the tray 36a, the tray is a shallow rectangular trough, which has an open top, side walls 36a1, 36a2, 36a3, and 36a4 and a bottom plate 38. It is understood that the material-receiving tray is shown as a rectangular body only as an example and that the tray may be square, hexagonal, or of any other suitable shape. Since the trays 36a, 36b, . . . 36n are secured to the conveyor 22, i.e., the belt, and should pass around the pulleys 34 and 36, they are made of a flexible material, e.g., silicone, which is chemically inert to the liquid photopolymerizable material 28, and is able to loop around the pulleys. To increase the efficiency of curing of the photopolymerizable material, the inner surfaces of the side walls 36a1, 36a2, 36a3, and 36a4 and the bottom plate 38 are coated with a reflective coating.

In other words, the conveyor 22 has a loading position on the side of the untreated material loading station and unloading position on the side opposite to the loading position, wherein, when the material-receiving trays pass through the unloading position, the material receiving trays are turned into upside-down positions, i.e., into position in which the open tops of the trays face down.

An essential part of the system 20 is a stationary prepolymerization chamber 38 that consists of a first prepolymerization station 38a and a second prepolymerization station 38b arranged in sequence above the conveyor 22 for passing through them the material-receiving trays 36a, 36b, . . . 36n on the way from the loading material input station 24 to the prepolymerized material output station 26. The material-receiving trays 36a, 36b, . . . 36n pass through the prepolymerization stations 38a and 38b in a continuous or an intermittent manner under control of a central processing unit 40 that, among other things, controls the operation speed of the drive motor 34 of the drive pulley 30 via a feedback line 42.

Two prepolymerization stations 38a and 38b are used instead of one in order not to interrupt the process. If one of the stations fails, the other continues to work, and the process is not interrupted. There is also a reason to believe that dividing the photo-prepolymerization process into two stages allows for finer selection of the viscosity in the final product. This opinion is based on the fact that the photopolymerization kinetics curve has an exponential form. During the normal operation of both stations, their light energy doses are shared as 50%/50%. If only one station operates, the load on it increases. Furthermore, the use of two-stage prepolymerization provides better control of the prepolymerization process, and makes it possible to improve the quality of the product obtained.

The photopolymerizable material that fills the material-receiving trays 36a, 36b, . . . 36n is supplied to these trays from the input station tank 37 via a dosing valve 44. The material contained in the trays is prepolymerized by photopolymerization under the effect of light emitted from light sources 46 and 48 installed in the respective stations 38a and 38b just above the path of the material-receiving trays 36a, 36b, . . . 36n.

The light sources 46 and 48 of both stations 38a and 38b provides a total light illumination power in the range of 5 to 5000 Wt. According to one specific embodiment of the invention, in each station, the LEDs are arranged in the form of a flat matrix of a rectangular or square-shaped configuration. The LEDs may operate on various lengths, such as 405 nm, 440 nm, etc. The main requirement to the light sources 46 and 48 is to provide high uniformity of illumination of the material in the trays with an accuracy within the range of ±5%. Each light source 46 and 48 may contain, e.g., 500 LEDs. It is understood that this amount is given only as an example and the final result will be defined by the total dose with which the prepolymerizable material is irradiated. The light sources 46 and 48 may be replaceable and operate on the same or different wavelengths.

It is known that different photopolymerizable precursors can react differently to different wavelengths of light radiation. Therefore, as mentioned above, the light sources 46 and 48 may be replaceable and consist of LEDs of different wavelengths. For example, the light sources 46 and 48 may operate on the wavelength of 405 nm or on the wavelength of 440 nm, or one of them may operate on the wavelength of 405 nm and another on the wavelength of 440 nm. It is understood that the specific wavelengths are given only as examples.

The optimal dose for obtaining the final product with optimal parameters acceptable for subsequent use of the obtained prepolymer for mixing with other components used in 3D printing may be reached by adjusting the time of exposure and the power of the illuminators. In other words, the dose D can be expressed by the following formula: $D = W \cdot t_{exp}$, where W is a power to which the prepolymerizable material was exposed and $t_{exp}$ is an exposure time. Thus, the value of D may be adjusted by changing the power W, the exposure time $t_{exp}$, or both.

The curing time of staying of the photopolymerizable material under the light filters and the intensity of the emitted light power, i.e., the radiation dose, can be adjusted (e.g., within the range of 2 sec to 60 sec) and depends on the material used and the viscosity of the prepolymerized material to receive.

The prepolymerized material obtained after passage through the second exposure station 38b is a gelatinous substance having viscosity in the range of 30000 to 50000 cPs (after homogenization). In fact, the material obtained in this stage consists of a gelatinous substance and a liquid. The viscosity is selected to provide flowability of the 3D printing material prepared in a mixture with the obtained prepolymer through pipelines of the 3D printing machine (not shown in the drawings).

The prepolymerized material output station 26 contains a separator 50 into which the prepolymerized product that has passed through the second station 38b falls from the tray when the latter loops over the driven pulley 32. The separator's interior is divided into two sections 50a and 50b by a tiltable sieve 50c, which passes the liquid phase of the prepolymerized material into the section 50b and retains the gelatinous phase in the section 50a. From the section 50a, the gelatinous phase is fed through a funnel 51 into a prepolymerized material receiver. In the illustrated case, the prepolymerized material receiver is shown as a crusher such as a shredder 52. The shredder 52 may be a conventional industrial shredder such as Twin Shaft Wagner Shredder WTS500 (Austria), or the like. The shredder breaks the gelatinous substance into small pieces having dimensions, e.g., in the range of 1-10 mm.

The final shredded prepolymerized product, which is one of the components to be mixed with minerals or other substances needed for 3D printing of buildings or parts of buildings, is unloaded from the system to a 3D printing machine (not shown) from a final prepolymer receiver 54. At the same time, the liquid phase of the prepolymerized material accumulated in the section 50b returns to the prepolymerizable material input station 24 under the action of a pumping unit 56 via a return pipeline 58. The final prepolymer receiver 54 is provided with an online viscometer 60 that measures viscosity of the obtained crushed and homogenized prepolymerized mass prior to unloading thereof to the 3D printing machine. An example of a viscometer is a Fungilab™ Alpha Series L Model Rotational Viscometer, Alpha Series L Model Rotational Viscometer that allows fast and accurate viscosity readings. Brand: Fungilab™ V100003.

The viscometer 60 is linked to the central processing unit 40 via a feedback line 62. As mentioned above, the central processing unit 40 may control and adjust the speed of rotation of the motor 34 and, hence, the linear speed of the conveyor 22, and the power of the light emitters 38a and 38b, and hence the radiation dose of the photopolymerizable material.

It is understood that the predetermined degree of prepolymerization, which affects the viscosity and other performance properties of the final flowable mass of crushed and homogenized prepolymer to be unloaded into the 3D printing apparatus, depends on the dose of irradiation of the material during the process of photopolymerization, and that such a dose is defined by the power of light emitted from the prepolymerization stations 38a and 38b and the speed of the conveyer 22. Since, in the system 20, the viscosity of the final product depends on such variables as the speed of the conveyor, the exposure time at the first station 38a, the exposure time at the second station, viscosity of the starting material in the container 28, the thickness of the layer of the photopolymerizable material, etc., it would be advantageous to select these parameters experimentally prior to setting the system to a continuous and automatic operation in a steady mode.

Alternatively, the required thickness of the material layer in each tray can be predetermined by calculations based on the Beer-Lambert law, which determines the attenuation of a parallel monochromatic beam of light when it propagates in an absorbing medium.

In other words, since the light emitted from the illuminators of the photopolymerization stations 38a and 38b decreases in the layer depth direction exponentially, knowing the constant of light absorption of the components, it is possible to evaluate a thickness of the layer of the material in the trays.

The feedstock material 28 that is fed into the input station 24 is a liquid mixture of components presented in Table 1. The viscosity of the material 28 is in the range of 5 to 15 cPs, density is in the range of 1.0 to 1.2 kg/l.

The produced prepolymerized material is a gelatinous homogeneous substance having viscosity in the range of 30000 to 50000 cPs. This material has an improved adhesiveness, resistance to environment, low shrinkage properties, and a short solidification time. A combination of these properties makes it possible to achieve a desired 3D printing result for a time shorter than with the use of conventional prepolymerized material.

TABLE 1

Characteristics of the Starting Photopolymerizable Material used in the System

Components and their Designations

| Parameter | PPO | PEG 4000 | TEGDMA |
|---|---|---|---|
| Chemical formula | Phenylbis(2,4,6-trimethylbenzoyl)phosphine oxide | Polyethylene glycol $H(OCH_2CH_2)_nOH$ | Triethylene glycol dimethacrylate $CH_2$=$C(CH_3)COO(CH_2CH_2O)_3COC(CH_3)$=$CH_2$ |
| CAS # | 162881-26-7 | 25322-68-3 | 109-16-0 |
| State of matter | Solid yellowish powder | Solid white powder | Transparent liquid |
| Content | 0.01 to 0.5% | 0.01 to 0.5% | 99.98 to 99.0% | a) The liquid photopolymerizable material is introduced into each movable tray in a predetermined dosed amount controlled through the dosing valve 44 in a manner known in the art. At the filling station, each tray stops by the command sent to the conveyor motor 34 from the central processing unit 40.

b) As soon as the filling operation is completed, the conveyor belt assumes its motion and moves until the tray is aligned with the position directly under the light source 46 of the first prepolymerization station 38a.

c) At the first prepolymerization station 38a, the material is exposed to a predetermined dose of radiation that provides prepolymerization of the photopolymerizable material to a first desired degree of prepolymerization.

d) After precuring on the first station, the conveyor belt 22 assumes its motion and aligns the tray that contains the precured material with the light source of the second station 38b.

e) The material precured on the stage 46 is then subjected to the final curing to achieve the desired degree of prepolymerization.

f) The Steps a) to e) proceed continuously, and, when, on its way along an endless looped path around the pulleys 30 and 32, the tray reaches the edge of the conveyer and changes its direction by looping around the pulley 32, it drops the final gelatinous prepolymerized material to the section 50a of the separator 50. The obtained material may contain a liquid uncured phase.

g) In the separator 50, the liquid uncured phase flows into the section 50b of the separator 50 and returns to the tank 24 via the pipeline 58 under the action of the pumping unit 56.

f) The separated homogenous prepolymerized material, which is obtained with a preset viscosity of 30000 to 50000 cPs and a temperature in the range of 30 to 40° C., is fed from the section 50a of the separator 50 via the funnel 51 to the crusher or shredder 52, and from the shredder to the prepolymer receiver 54, where the viscosity of the prepolymer is controlled by the online viscometer 60.

g) The final prepolymer is unloaded from the receiver 54 in the direction of the arrow B to the mixer of a 3D printing machine (not shown).

APPLICATION EXAMPLE 1

A prepolymerizable mixture suitable for photoprepolymerization was prepared from 80 liters of triethylene glycol dimethacrylate
($CH_2$=$C(CH_3)COO(CH_2CH_2O)_3COC(CH_3)$=$CH_2$
(TEGDMA), 40 g of phenylbis (2,4,6-trimethylbenzoyl) phosphine oxide (PPO—prepolymerization initiator) and 40 g of polyethylene glycol $H(OCH_2CH_2)_nOH$ (PEG). The mixture was filtered for removal of inclusions and poured into a trough 36a via the dosing valve 44. The trough filling time was 50 sec. The filled trough was then sent to the first prepolymerization station 38a. The first prepolymerization station contained 500 LEDs with a maximal light emission energy 45 W, of which only about 90% (40 W) was used for irradiation of the prepolymerizable mixture. The irradiation time was 27 sec. The mixture pretreated on the first prepolymerization was transferred to the second prepolymerization station 38b, which contained 500 LEDs with a total light emission energy 45 W, of which only about 90% (40 W) was used for irradiation of the prepolymerizable mixture. The irradiation time was 27 sec. Thus, the radiation dose on each station was 40 W×27 sec=about 1080 J, i.e., 1.08 kJ and the total radiation dose was 2.16 kJ. The viscosity of the final prepolymerized material, which was unloaded into a construction 3D printer (not shown) after filtration through the sieve 50c and the shredder 52, was 39500 cps. Since in this case the viscosity of the final product was within the prescribed range, the product was suitable for use in construction 3D printing.

COMPARATIVE EXAMPLE 1

A prepolymerizable mixture suitable for photoprepolymerization was prepared from 80 liters of triethylene glycol dimethacrylate
($CH_2$=$C(CH_3)COO(CH_2CH2O)_3COC(CH3)$=$CH_2$
(TEGDMA), 40 g of phenylbis (2,4,6-trimethylbenzoyl) phosphine oxide (PPO—prepolymerization initiator) and 40 g of polyethylene glycol $H(OCH_2CH_2)_nOH$ (PEG). The mixture was filtered for removal of remnants of solid PEG 4000, and poured into a trough 36a via the dosing valve 44. The trough filling time was 50 sec. The filled trough was then sent to the first prepolymerization station 38a. The first prepolymerization station contained 500 LEDs with a total light emission energy 45 W, of which only about 90% (40 W) was used for irradiation of the prepolymerizable mixture. The irradiation time was 27 sec. The mixture pretreated on the first prepolymerization was transferred to the second prepolymerization station 38b, which contained 500 LEDs with a total light emission energy 45 W, of which only about 90% (40 W) was used for irradiation of the prepolymerizable mixture. The irradiation time was 25 sec. Thus, the radiation dose on each station was 40 W×25 sec=about 1000 J, i.e., 1 kJ and the total radiation dose was 2 kJ. The viscosity of the final prepolymerized material, which was unloaded into a construction 3D printer (not shown) after filtration through the sieve 50c and the shredder 52 was 29000 cPs. Since in this case the viscosity of the final product was beyond the prescribed range, the product was unsuitable for use in construction 3D printing.

COMPARATIVE EXAMPLE 2

A prepolymerizable mixture suitable for photoprepolymerization was prepared from 80 liters of triethylene glycol dimethacrylate $(CH_2=C(CH_3)COO(CH_2CH_2O)_3COC(CH_3)=CH2$ (TEGDMA), 40 g of phenylbis (2,4,6-trimethylbenzoyl) phosphine oxide (PPO—prepolymerization initiator) and 40 g of polyethylene glycol $H(OCH_2CH_2)_nOH$ (PEG). The mixture was filtered for removal of remnants of solid PEG 4000, and poured into a trough 36a via the dosing valve 44. The trough filling time was 50 sec. The filled trough was then sent to the first prepolymerization station 38a. The first prepolymerization station contained 500 LEDs with a total light emission energy 45 W, of which only about 90% (40 W) was used for irradiation of the prepolymerizable mixture. The irradiation time was 29 sec. The mixture pretreated on the first prepolymerization was transferred to the second prepolymerization station 38b, which contained 500 LEDs with a total light emission energy 45 W, of which only about 90% (40 W) was used for irradiation of the prepolymerizable mixture. The irradiation time was 29 sec. Thus, the radiation dose on each station was 48 W×29 sec=about 1160 J, and the total radiation dose was 2.32 kJ. The viscosity of the final prepolymerized material, which was unloaded into a construction 3D printer (not shown) after filtration through the sieve 50c and the shredder 52 was 53200 cPs. Since in this case the viscosity of the final product was beyond the prescribed range, the product was unsuitable for use in construction 3D printing.

Thus, it can be seen that selection of an optimal dose of irradiation is a very important factor for prepolymerization of a mixture consisting of TEGDMA, PPO, and PEG prepared in proportions of 80 liters, 40 g, and 40 g, respectively. It is understood that this result was obtained for a prepolymerizable material composed of TEGDMA, PPO, and PEG and for the contents of these components in predetermined proportions.

The invention has been described with reference to specific examples and drawings. It is understood that these examples and drawings should not be construed as limiting the scope of application of the invention and that any changes and modifications are possible within the limits of the attached patent claims. For example, light sources other than LEDs and with wavelengths different from those indicated above can be used. The trays may have shapes different from those shown in FIG. 2. More than two prepolymerization stations can be used. Components of the original photopolymerizable composition may be different from those shown in the table and examples. The trays are not necessarily flexible. A pulsing pump can be used instead of the dosing valve for loading the trays with a dosed amount of the precursor material.

What we claim is:

1. A system for obtaining a photopolymerized prepolymer comprising:
    an untreated material loading station for loading an untreated liquid material to be prepolymerized;
    a closed loop conveyor carrying a plurality of material-receiving trays secured to the closed loop conveyor, arranged in sequence, and having open tops, the closed loop conveyor having a loading position on the side of the untreated material loading station and an unloading position on the side opposite to the loading position, wherein, when the material-receiving trays pass through the unloading position and changes direction of movement, the material receiving trays are turned into upside-down positions;
    at least one prepolymerization station above the closed loop conveyor in a position that passes therethrough the material-receiving trays for irradiation of the untreated liquid material carried by the material-receiving trays by a dosed amount of light energy for photoprepolymerization, wherein the at least one prepolymerization station is configured to convert at least a portion of the material carried by the material-receiving trays into a prepolymerized material with a predetermined degree of prepolymerization that does not convert the material into a fully cured polymerized material; and
    a prepolymerized material receiver located under the unloading position.

2. The system according to claim 1, wherein the closed loop conveyor further comprises pulleys around which the closed loop conveyor is guided, one of the pulleys being a driving pulley which is provided with a driving motor.

3. The system according to claim 2, wherein the prepolymerized material receiver is provided with a viscometer for measuring viscosity of the prepolymerized material.

4. The system according to claim 3, further comprising a central processing unit, which is linked via feedback lines with the viscometer and the driving motor of the driving pulley.

5. The system according to claim 4, wherein the material-receiving trays are flexible for passing through the unloading position of the closed loop conveyor where the conveyor changes direction of movement.

6. The system of claim 1, where the number of prepolymerization stations is two.

7. The system according to claim 6, wherein the closed loop conveyor further comprises pulleys around which the closed loop conveyor is guided, one of the pulleys being a driving pulley which is provided with a driving motor.

8. The system according to claim 7, wherein the prepolymerized material receiver is provided with a viscometer for measuring viscosity of the prepolymerized material.

9. The system according to claim 8, further comprising a central processing unit, which is linked via feedback lines with the viscometer and the driving motor of the driving pulley.

10. The system according to claim 9, wherein the material-receiving trays are flexible for passing through the unloading position of the closed loop conveyor where the conveyor changes direction of movement.

11. The system according to claim 1, wherein the trays are coated with a reflective coating.

12. The system according to claim 1, wherein the prepolymerized material converted at the at least one prepolymerization station has a viscosity in the range of 30000 to 50000 cPs.

13. The system according to claim 1, wherein the predetermined degree of prepolymerization is achieved by exposing the material carried by the material-receiving trays to radiation at the at least one prepolymerization station for a predetermined amount of time.

14. The system according to claim 1, wherein each of the material-receiving trays defines a shallow trough having a bottom and side walls.

15. The system according to claim 1, wherein the at least one prepolymerization station is configured to convert at least a portion of the untreated liquid material to be prepolymerized into a gelatinous prepolymerized material.

16. The system according to claim 15, further comprising:
a dosing valve located between the untreated material loading station and the closed loop conveyor, wherein the dosing valve is configured to fill the material-receiving trays with dosed amounts of the liquid material to be prepolymerized.

17. The system according to claim 16, further comprising:
a separating component located under the unloading position of the dosed loop conveyor, wherein the separating component is configured to receive all material from a material-receiving tray and to separate any liquid material from the gelatinous prepolymerized material; and
a return pipeline configured to return the separated liquid material to the untreated material loading station.

18. The system according to claim 17, further comprising:
a shredder configured to receive the gelatinous prepolymerized material from the separating component and to shred the gelatinous prepolymerized material into pieces of predetermined dimensions.

19. The system according to claim 18, further comprising:
a viscometer installed in the shredder, where the viscometer is configured to measure a viscosity of the gelatinous prepolymerized material.

20. The system according to claim 19, further comprising:
a central processing unit in communication with the at least one prepolymerization station and the viscometer, wherein the central processing unit is configured to control operation of the at least one prepolymerization station based on the measured viscosity of the gelatinous prepolymerized material in order to irradiate future material to be prepolymerized to said predetermined viscosity during an ongoing production process.

* * * * *